Oct. 14, 1969  W. R. LEOPOLD, JR., ET AL  3,472,532
COMPRESSIVE JOINT COUPLING FOR FLARELESS TUBES
Filed June 14, 1967  3 Sheets-Sheet 1
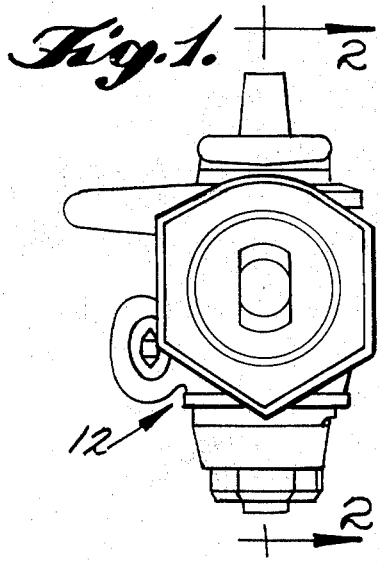
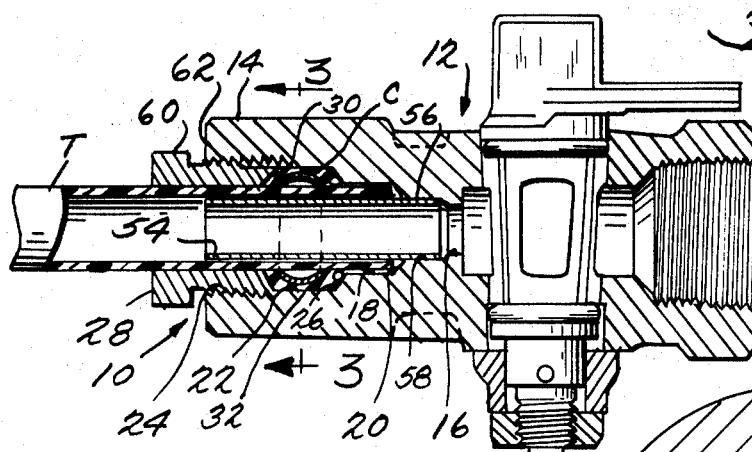
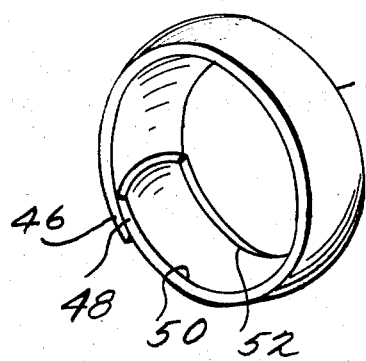
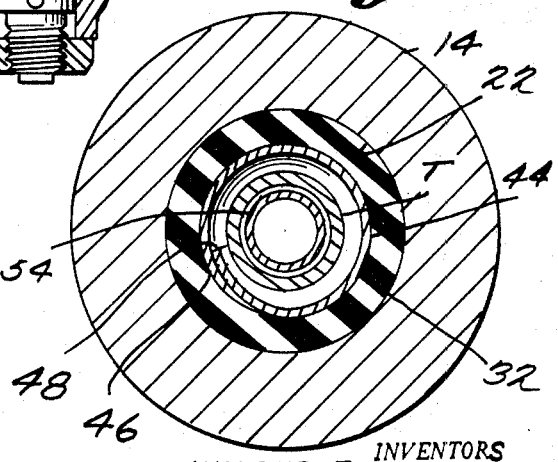
INVENTORS
WILBUR R. LEOPOLD, JR.
CARL E. FLOREN
PAUL A. AMMANN
Cushman, Darby & Cushman
ATTORNEYS Oct. 14, 1969  W. R. LEOPOLD, JR., ET AL  3,472,532
COMPRESSIVE JOINT COUPLING FOR FLARELESS TUBES
Filed June 14, 1967  3 Sheets-Sheet 2

INVENTORS
WILBUR R. LEOPOLD, JR.
CARL E. FLOREN
BY PAUL R. AMMANN

Cushman, Darby & Cushman
ATTORNEYS

Oct. 14, 1969   W. R. LEOPOLD, JR., ET AL   3,472,532
COMPRESSIVE JOINT COUPLING FOR FLARELESS TUBES
Filed June 14, 1967                                     3 Sheets-Sheet 3

INVENTORS
WILBUR R. LEOPOLD, JR.
CARL E. FLOREN
PAUL R. AMMANN
BY
Cushman, Darby & Cushman
ATTORNEYS

United States Patent Office 3,472,532
Patented Oct. 14, 1969

3,472,532
COMPRESSIVE JOINT COUPLING FOR FLARELESS TUBES
Wilbur R. Leopold, Jr., Carl E. Floren, and Paul R. Ammann, Decatur, Ill., assignors to Mueller Co., Decatur, Ill., a corporation of Illinois
Filed June 14, 1967, Ser. No. 645,990
Int. Cl. F16l 59/16, 21/00, 55/00, 11/12
U.S. Cl. 285—54
10 Claims

ABSTRACT OF THE DISCLOSURE

A compressive joint coupling for flareless tubes provided with a confined variable volume compression chamber between two relatively removable members, a non-compressible annular gasket seal made of deformable elastic material positioned within the compression chamber, the gasket seal carrying a split metallic ferrule having overlapping ends, the ferrule being arcuate in radial section and adapted to grip the tube when the relatively movable members are moved toward one another to deform the gasket seal.

---

The present invention relates to an improvement in couplings for flareless tubes, the couplings being of the type having a compression chamber therein between relatively movable members, a gasket seal in the compression chamber for sealingly engaging the tube, and a ferrule carried by the gasket for gripping the tube to prevent axial displacement.

Heretofore compression couplings have utilized an annular elastic sealing means preformed to a shape of an interior recess or compression chamber, the elastic sealing means carrying a split metallic ferrule for gripping the tube. Such prior arrangements, while having limited commercial success, did not in all situations provide a satisfactory coupling or joint for flareless tubes as they did not assemble correctly in every instance to provide satisfactory gripping. The ferrules used with such prior art arrangements were of the "butt type" and thus were provided with a split or gap between the ends of the same. When the annular elastic seal was deformed by the application of torque to the follower nut, the ferrule oftentimes had its ends butted together prior to gripping the tube and prior to application of sufficient torque. Since the ferrule prevented further application of torque and could not contract sufficiently to grip the tube, a very unsatisfactory joint resulted. In other instances where the gap between the ends of the ferrule did not close upon the application of torque, the elastic gasket seal, since it had filled up the normal confines of the compression chamber, would extrude upon further application of torque, between the ends of the ferrule into the space beneath the ferrule and between the ferrule and the tube. This situation provided a very unsatisfactory joint as even or uniform gripping around the periphery of the tube could not be obtained since the material extruded to the area between the ferrule and the tube did not flow completely around the tube. The above-mentioned difficulties encountered in such prior arrangements were further accentuated by the normal manufacturing tolerances for the various parts of the couplings and as will now be apparent, the tolerances could build up one way or the other to provide for a very unsatisfactory joint. This would be true in situations wherein the two relatively moving members of the coupling bottomed upon each other or did not bottom upon each other. To have a satisfactory joint with the prior art arrangements, it was necessary to reduce tolerances to a minimum in the various parts so that when the follower nut bottomed on the fitting, the ends of the ferrule butt, no more or no less as the axial adjustment of the chamber is limited by the space or gap in the ferrule.

An object of the present invention is to provide an improved compression coupling in which the relatively movable members of the coupling bottomed against one another in an extend range between a minimum torque for satisfactory gripping with a maximum torque.

Ancillary to the above object is a further object of the present invention to provide an improved compression coupling in which normal manufacturing tolerances of the various parts may build up in one direction or the other and yet are so compensated for by the coupling that they do not interfere with the installation of the coupling as in each instance the relatively movable parts of the coupling bottom against one another and yet the coupling has satisfactory holding power for the tube. A further object of the present invention is to provide a coupling arrangement for flareless thin wall tubes which can be assembled by the installer without the installer worrying about under or overtightening of the coupling nut as in every instance of assembly, the installer merely tightens the coupling nut until it bottoms on the fitting.

A still further object of the present invention is to provide an improved gasket seal-ferrule combination which seals, grips the tubing and gives an extended range of axial adjustment even when the gasket seal completely fills the normal compression chamber but prior to the gripping of the ferrule.

Another object of the present invention is to provide an improved coupling arrangement utilizing a deformable elastic gasket seal and ferrule, the coupling arrangement being either a conducting or nonconducting fitting.

Still another object of the present invention is to provide an improved coupling arrangement for flareless plastic tubes, the coupling being of the compression type but provided with means to prevent the plastic tube from collapsing during installation.

A further object of the present invention is to provide an improved coupling arrangement which is simple and inexpensive to manufacture and which may be utilized both in fluid lines such as gas and water lines or the like.

A still further object of the present invention is to provide an improved coupling arrangement which utilizes an overlapping ferrule within an elastic gasket seal, the overlapping ferrule providing initial tube deformation which does not amplify distortion but deforms the tube with reasonable uniformity. In prior arrangements of couplings utilizing only rubber gasket seals or rubber gasket seals with ferrules of the butt joint type, the elastic gasket seal would transmit forces hydrostatically to the weakest points on the thin wall tubes. Usually this deformation was a tri-lobular or other nonuniform deformation which provided an unsatisfactory joint.

These and other objects and advantages of the present invention will appear more fully in the following specification, claims and accompanying drawings in which:

FIGURE 1 is an end view of a stop or plug valve in which the coupling arrangement of the present invention may be utilized;

FIGURE 2 is a sectional view taken generally on the line 2—2 of FIGURE 1 and illustrating the coupling of the present invention securing a plastic tube;

FIGURE 3 is a further sectional view of the invention of FIGURE 1, the view being taken on the section line 3—3 of FIGURE 2;

FIGURE 8 is an end elevational view of the gasket seal used with the couplings of 1, 4, 6 and 7;

FIGURE 9 is a view partly in section and partly in elevation taken on the line 9—9 of FIGURE 8;

FIGURE 12 is a perspective view of the metallic ferrule of the present invention used with all of the forms of coupling arrangements disclosed.

Figure 4:
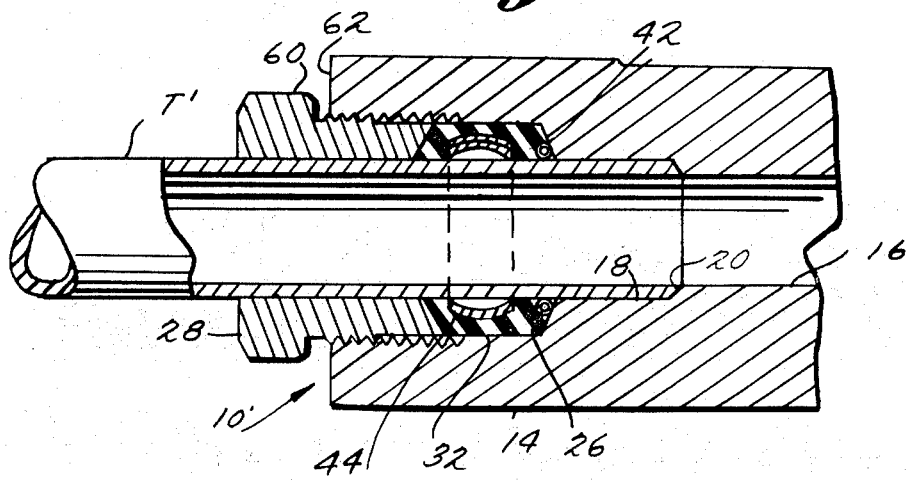
FIGURE 4 is an axial sectional view of a modified coupling arrangement of the present invention, the coupling arrangement being electrically conductive.

Referring now to the drawings wherein like character or reference numerals represent like or similar parts, there is disclosed in FIGURES 1 to 3 inclusive a compression coupling generally designated at 10, of the present invention. The coupling 10 is illustrated in association with a stop or plug valve 12 but it will be appreciated that the coupling could be used for the connection of the flareless tube T in many other environments such as a service T or the like. For the purpose of this description, the body of the stop 12 will be referred to as a fitting 14, it being understood that the term "fitting" as used in the specification and claims is intended to cover any suitable member to which it is desired to connect the tube T.

The fitting 14 of the coupling 10 illustrated in FIGURES 1 to 3 is provided with a bore 16 and a counterbore 18 for receiving the end of the tube T. The counterbore 18 at its innermost end defines with the bore 16 a shoulder 20 for abutting against the end of the tube T to limit its axial inward movement into the fitting 14 during installation. Fitting 14 is further provided with an enlarged second counterbore 22 which is interiorly threaded at its outer end as indicated at 24. The second counterbore 22 at its innermost end is provided with an inwardly tapered or conical wall 26.

A follower nut 28 exteriorly threaded and having a concave conical end wall 30 is adapted to be received in the threads 24, the conical end wall 30 opposing the conical end wall 26 to define therebetween a variable volume recess or compression chamber C for the reception of a noncompressible but deformable annular elastic gasket seal 32. The gasket seal 32 is preferably made of an elastomeric material, such as rubber or a rubber-like substitute and as shown in FIGURES 8 and 9 it is provided with a radial cross-section which is trapezoidal in shape so as to define end walls 34 and 36 which cooperate with the end walls 26 and 28 respectively. A bore 38 extends through the gasket seal 32 and when the gasket seal is molded, it is provided with an annular groove 40 in the bore 38, the groove 40 having a surface which is arcuate in radial cross-section. It will be noted by reference to FIGURE 9 that the groove 40 is axially positioned closer to one end of the gasket seal 32 than to the other end and the purpose of this positioning of the groove 40 is to provide sufficient body in the gasket seal 32 to position a bronze coil spring 42 around one end of the bore 38. The coil spring 42, which is molded into the gasket seal 32, functions as a good electrical connection between adjoining sections and coupling parts when the coupling is of a conductive type and it also functions as an effective block to prevent extrusion of the gasket seal 30 between the end portion of the tube T and the counterbore 18 of the fitting 14.

A metallic ferrule 44 (FIGURE 12) is carried in the groove 40 of the gasket seal 32, the metallic ferrule being arcuate in radial cross-section and complementary to the arcuate surface of the groove 40. As best shown in FIGURES 3 and 12, the metallic ferrule 44 has end portions 46 and 48 which overlap when the ferrule is in its relaxed position. Additionally, the ferrule, which is preferably made of spring steel, is provided with specially prepared inwardly facing circumferential edges 50 and 52 which are adapted to engage and grip the tube or pipe T when inward pressure is applied around the ferrule to cause the ferrule to contract with its overlapping end portions 46 and 48 sliding over each other.

The ferrule 44 and the gasket seal 32 when assembled together as a unit may be slid over the end of the tube and manually slid along the tube but preferably the tolerances are such that once it is slid onto the tube T it will be frictionally retained relative to the tube in the absence of a manual force. In this respect, the diameter of the bore 38 and the minimum diameter of the ferrule 44 must be at least equal to the external diameter of the tube T. Preferably the aforementioned interior diameter of the ferrule 44 and the gasket seal 32 are slightly greater than the external diameter of the tube T so that they slide along the same but will remain in a fixed position on the tube due to the natural friction between the gasket seal and the tube.

The coupling 10 as shown in FIGURES 1 to 3 is of the type utilized for connecting the tube T when the tube is made of a plastic material. Tubes made of a plastic material are relatively flexible and in order to be sure that the tube T is properly gripped, the interior of the tube must be braced so that the tube does not collapse when the ferrule 44 and gasket seal 32 are contracted about the same. To insure that the tube T made of plastic material will not collapse, a tubular sleeve member 54 made of a rigid material, preferably steel, is inserted into the end portion of the tube T. The end portion 56 of the sleeve member 54 fits in a counterbore 58 provided between the bores 16 and 18 for receiving the same, the sleeve member being preassembled into fitting 14 at the factory.

When it is desired to assemble the coupling 10 just previously described, the tube T is stabbed through the follower nut 28, gasket seal 32 onto the projecting end of the sleeve member 54 until it abuts the shoulder 20. When the positioning of the tube T is accomplished, the follower nut 28 and gasket seal 32 are in the position shown in FIGURE 2 where the gasket seal 32 is still relaxed but it fills the recess or compression chamber C. At this stage of the installation of the coupling 10, the ferrule is not gripping the tube T nor is the gasket seal 32 making a sealing contact around the periphery of the tube T as the follower nut 28 has zero torque. The follower nut 28 is then tightened by the installer until its outer portion 60 bottoms on the end 62 of the fitting 14. Since the compression chamber C is completely filled with the gasket seal 32 at the start of the application of torque to the follower nut, such an application of torque will cause the gasket seal to deform. As the axial length of the chamber C decreases, the gasket seal must deform as it is made of a noncompressible material. The pressure exerted by the gasket seal 32 on the ferrule 44 varies the shape of the chamber as the overlapping ends 46 and 48 of the ferrule are slid over one another due to the equal pressure being applied all the way around the same and the edges 50 and 52 will grip the exterior of the tube T. The gripping action of the ferrule 44 against the plastic tube T results as the rigid sleeve member 56 prevents the plastic tube from collapsing.

Referring now to FIGURE 4 there is disclosed a modified coupling 10' of the present invention for connecting a tube T' made of a relatively rigid conductive material such as copper. In the particular coupling 10', it is desired that the coupling be conductive and, therefore, there is no insulation between the tube T', follower nut 28 and fitting 14. The coupling as shown in FIGURE 4 is at zero torque as the follower nut has just been threaded into the fitting to a point where it bottoms against the gasket seal 32 but has not deformed the same and, of course, the elastic gasket seal 32 and the ferrule 44 are completely relaxed.

The coupling arrangement 10' differs from the coupling arrangement 10 in that it is not necessary to provide a tubular sleeve member to back up the inside of the relatively rigid tube T' and consequently it is not necessary to provide a counterbore between the bore 16 and the bore 22, although for an economy measure such a counterbore could be provided but not used. Other than that, the coupling 10' is substantially identical to the coupling 10 and is assembled in the same manner. In the arrangement shown in FIGURE 4, the coil spring 42 of the gasket seal 32 not only functions to prevent extrusion of the gasket between the bore 16 and the end portion of the tube T' but it also insures a good electrical connection between the fitting 14 and the tube T'. Of course, there is also a further electrical connection between the fitting 14 and the tube T' through the follower nut 28.

Figure 5:
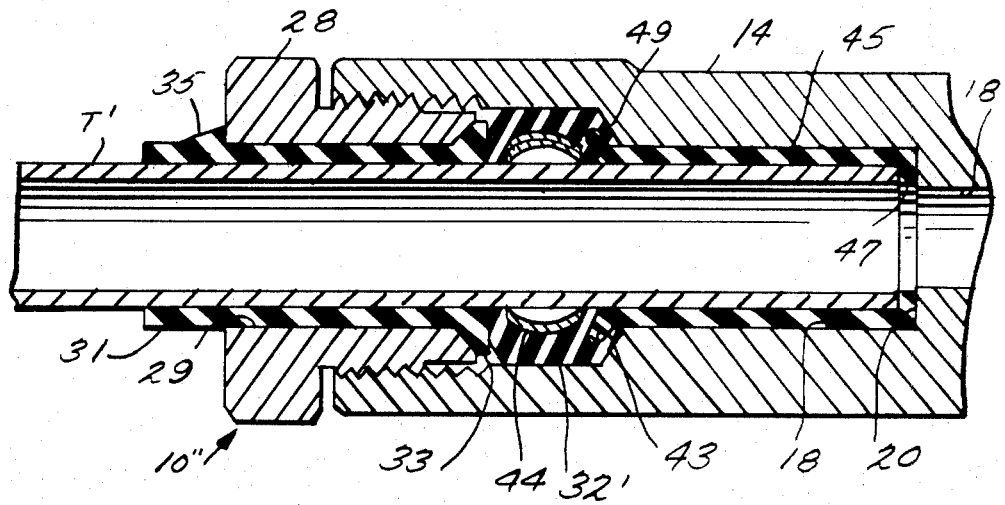
FIGURE 5 is an axial sectional view similar to FIGURE 4 but disclosing a further modification of the present invention, the coupling being electrically nonconductive.

Referring now to FIGURE 5 there is disclosed a further modification of the present invention in the form of a coupling 10" which provides insulation between the tube T', the follower nut 28 and the fitting 14. In this particular arrangement of the invention, the follower nut 28 is provided with an enlarged bore 29 therethrough which has a diameter greater than the exterior diameter of the tube T'. A nut insulator sleeve member 31 made of nylon or other suitable nonconductive material is carried in the bore 29 of the nut 28, the sleeve 31 having an interior diameter greater than the exterior diameter of the tube T' so that it can slip on the tube. The sleeve member 31 is provided with a flanged end 33 for abutting against the gasket seal 32'. It is assembled as a unit with the nut 28 in that it is provided with lugs 35 circumferentially spaced about its exterior, the lugs 35 enabling the sleeve member to be slipped through the nut until the lugs snap into position as shown.

Figure 10:
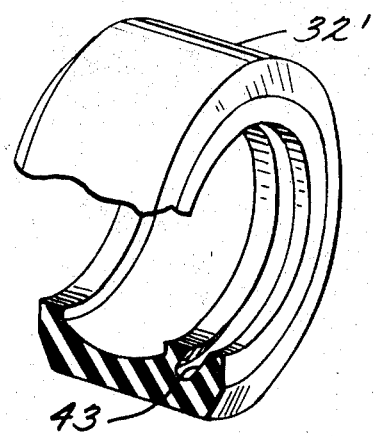
FIGURE 10 is a perspective view of a modified form of gasket seal used in the coupling arrangement of FIGURE 6, the view being partly in section.
Figure 11:
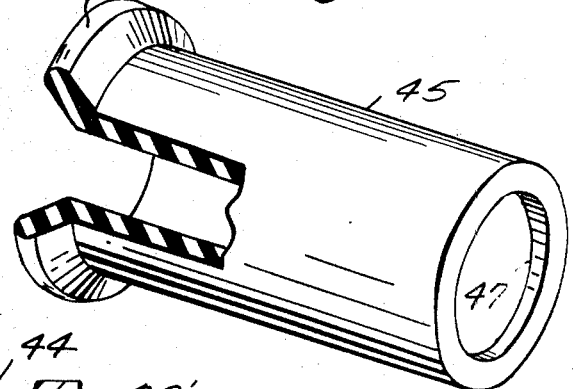
FIGURE 11 is a perspective view, partly in section, of the insulator sleeve member for cooperating with the gasket seal of FIGURE 10.

The gasket seal 32' for coupling 10" is shown in detail in FIGURE 10 and it will be noted that instead of being provided with a coil spring 42, it is provided at one of its ends with a conical shaped groove 43. Other than providing the gasket seal 32' with the groove 43, it is identical in shape to the gasket seal 32 and it is arranged to receive the ferrule 44 with the overlapping ends 46 and 48. A tubular insulating sleeve member 45 having a radially inwardly extending annular flange 47 at one end thereof and an outwardly flared flange 49 at the other end thereof is provided for fitting over the end portion of the tube T' to insulate the same from the fitting 14. It will be noted that the gasket seal 32' is snapped onto the flange 49 with the flange being received in the groove 43 so that these two elements together with the ferrule 44 comprise a unit. The sleeve member 45 fits into the counterbore 16 and abuts the shoulder 20, the tube T' fitting into the sleeve member 45 and abutting the flange 47.

The coupling arrangement shown in FIGURE 5 is also disclosed with zero torque applied to the follower nut 28. It will be appreciated that when the follower nut 28 is threaded into the fitting 14 it will cause the noncompressible but deformable gasket seal 32' to peripherally squeeze the ferrule so that the ferrule contacts and grips the pipe.

Figure 6:
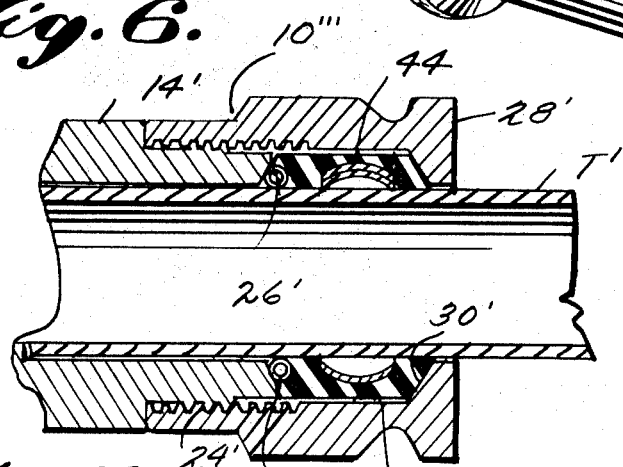
FIGURES 6 and 7 are similar axial sectional views of a slightly modified form of the coupling of the present invention, the view in FIGURE 6 disclosing the coupling having a minimum torque applied to the follower nut to provide satisfactory gripping of the tube whereas FIGURE 7 discloses maximum torque being applied to provide maximum gripping of the tube.
Figure 7:
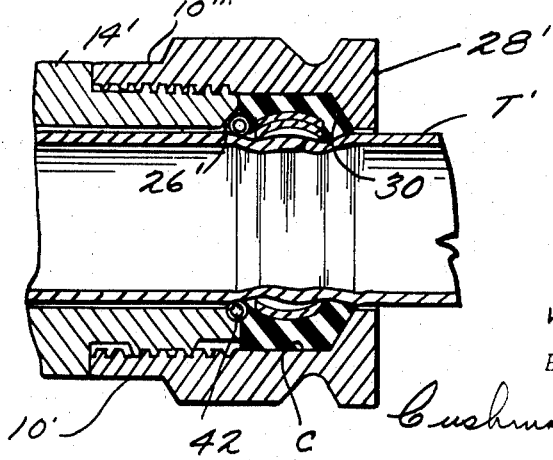

Referring finally to FIGURES 6 and 7, there is disclosed a still further but only slightly modified form of the coupling 10''' of the present invention. In the arrangement shown in FIGURES 6 and 7 the fitting 14' is provided with exterior threads 24' and the follower nut 28' is provided with interior threads as distinguished from the reverse arrangement as heretofore described. In this particular coupling arrangement the fitting 14' does not have to be provided with an enlarged counterbore at its outer end to receive the threads and define a wall portion of the compression chamber C as the compression chamber C is provided for within the follower nut 28'. Of course, the compression chamber C is still provided at its ends with respective annular conical end walls 30' and 26' formed respectively in the follower nut 28' and in the end of the fitting 14'.

In FIGURE 6, it will be noted that the nut 28' has bottomed against the fitting 14' and this view is to represent a condition where a minimum amount of torque has been applied to the nut to cause the same to bottom and yet there has been sufficient reduction in axial length of the chamber C to cause the ferrule 44 to satisfactorily grip the tube T. In the arrangement shown in FIGURE 6, it represents the coupling 10''' made up on the tube T' having a minimum outside diameter within its tolerance range and with all of the tolerances of the various elements of the coupling building up on the high side of their tolerance range.

FIGURE 7, which is the identical coupling 10''' to that of FIGURE 6, represents the coupling made up on tubing having a maximum outside diameter within the manufacturing tolerance range and with all of the manufacturing tolerances of the elements of the coupling building up in the opposite way wherein the tolerances are at the minimum side of their range. It will be noted that in FIGURE 7 the compression chamber has been reduced in volume axially even less than in FIGURE 10 and consequently there is sufficient contraction of the ferrule to indent the tubing thus resulting in a good grip.

It will be seen that the objects and advantages of the present invention have been fully and effectively accomplished by the fitting disclosed in the specification and disclosed in the drawings. However, it will be further realized that various changes may be made in the specific embodiments of the coupling shown and described without departing from the principles of the invention. Therefore, the terminology used throughout the specification is for the purpose of description and encompasses all modifications of the invention.

What is claimed is:

1. An improvement in a coupling joint for flareless tubes comprising: a fitting having a bore therein for receiving the end portion of a flareless tube; a follower nut threadedly received by said fitting, said follower nut and said fitting defining therebetween an annular recess surrounding the tube, the recess defining a compression chamber having a variable volume as the follower nut is threaded to the fitting, said follower nut and said fitting having opposed walls defining end walls of said recess; a non-compressible annular gasket seal made of a deformable elastic material, said annular gasket seal being disposed in said recess and surrounding the tube, said annular gasket seal having a bore therethrough with an interior diameter at least equal to the exterior diameter of the tube to permit the seal to be manually slid along but also frictionally held on the tube, said annular gasket seal further having a shape in radial cross-section generally similar to the shape of said compression chamber and having an annular groove in the bore thereof, said groove being arcuate in radial cross-section; and a split metallic ferrule arcuate in radial cross-section and received in the groove in said annular gasket seal, said metallic ferrule when relaxed having overlapping end portions to permit said compression chamber to be varied in volume in an axial direction even after said gasket seal fills the same whereby said follower nut can be bottomed against said fitting at a satisfactory minimum holding torque or at a maximum holding torque thereby compensating for buildup from normal manufacturing tolerances in the coupling.

2. A coupling joint as claimed in claim 1 in which said groove in said annular gasket seal is positioned closer to one end of said gasket seal bore than to the other end.

3. A coupling joint as claimed in claim 2 in which a coil spring is molded into said gasket seal at the other end of said bore.

4. A coupling joint as claimed in claim 1 including an elongated tubular insulating member having an outwardly flared flange at one end and a radially inwardly extending annular flange at the other end, said member fitting on the end portion of the tube, said gasket seal having a groove in its end complementary to and receiving the outwardly flared flange of said tubular insulating member.

5. A coupling joint as claimed in claim 4 including a tubular insulating sleeve member carried by said follower nut for insulating the follower nut from the tube.

6. A coupling joint as claimed in claim 1 in which the tube is made of a plastic material and in which a rigid sleeve member is inserted within the end portion of the tube to prevent collapse of the same when said ferrule grips the tube.

7. A coupling joint as claimed in claim 1 in which said follower nut is interiorly threaded and in which said fitting is exteriorly threaded for receiving the same.

8. A coupling joint as claimed in claim 1 in which said follower nut is exteriorly threaded and in which said fitting is interiorly threaded to receive the same.

9. For use with tube fittings having a compression chamber therein: a noncompressible annular gasket seal made of a deformable elastic material, said annular gasket seal having a bore therethrough with an interior diameter at least equal to the exterior diameter of the tube to permit the same to be manually slid along the tube on which it is to be used, said annular gasket seal having a groove in the bore thereof which is arcuate in radial cross-section; and a split metallic ferrule carried within the groove of said annular gasket seal, said ferrule being arcuate in radial cross-section complementary to said groove and having overlapping end portions when relaxed, said metallic ferrule further having a minimum inside cross-section at least equal to the exterior diameter of the tube whereby said ferrule when carried by said gasket seal does not interfere with the sliding of said gasket seal along the tube, said overlapping end portions of said ferrule preventing extrusion of said gasket seal between the ferrule and the tube when tightening of the fitting causes the gasket seal to deform and the ferrule to grip into the surface of the tube.

10. The structure as claimed in claim 9 in which said gasket seal is trapezoidal in radial cross-section thereby causing the same to exert uniform inward pressure on the ferrule upon tightening of the fitting.

References Cited

UNITED STATES PATENTS

| 1,334,682 | 3/1920 | Snell | 285—249 |
| 2,187,880 | 1/1940 | Kaysing | 285—341 X |
| 2,269,695 | 1/1942 | Scharf | 285—53 |
| 2,585,453 | 2/1952 | Gallagher. | |

FOREIGN PATENTS

| 666,072 | 7/1963 | Canada. |
| 551,006 | 2/1943 | Great Britain. |
| 662,231 | 12/1951 | Great Britain. |
| 779,959 | 7/1957 | Great Britain. |

CARL W. TOMLIN, Primary Examiner

W. L. SHEDD, Assistant Examiner

U.S. Cl. X.R.
285—247, 341, 354